Sept. 20, 1960     D. A. HIGHT ET AL     2,953,216
ENGINE ATTACHMENT
Filed Dec. 9, 1958     2 Sheets-Sheet 1
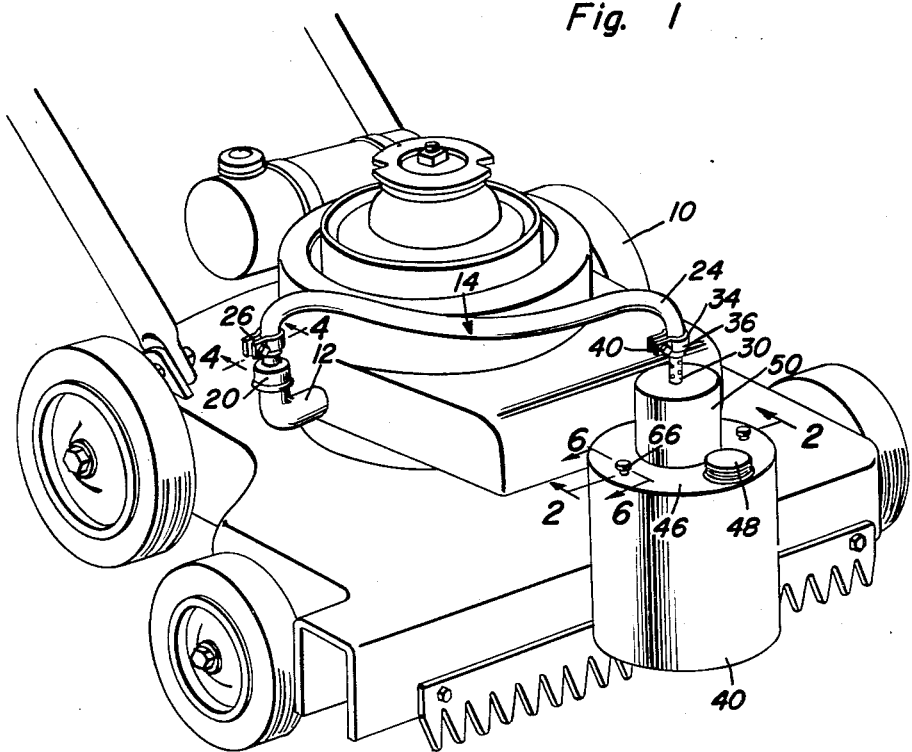
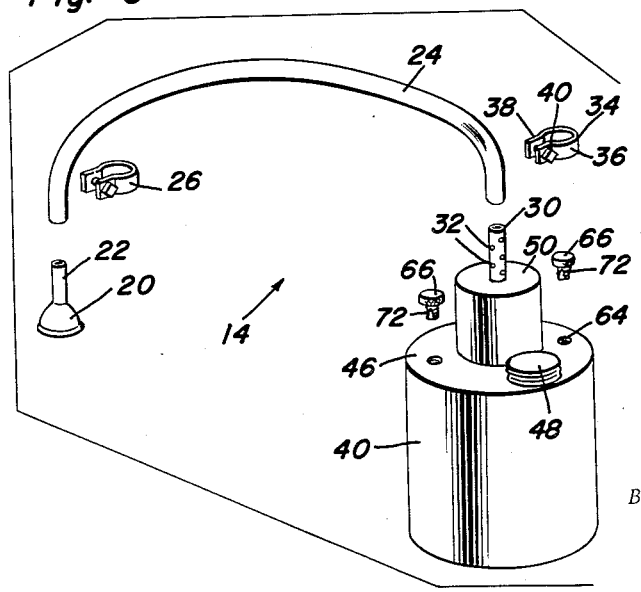
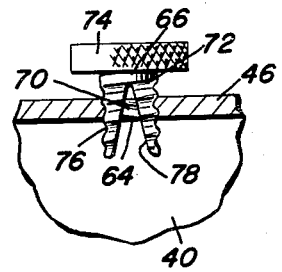
David A. Hight
John T. Mitchiner
INVENTORS Sept. 20, 1960  D. A. HIGHT ET AL  2,953,216
ENGINE ATTACHMENT
Filed Dec. 9, 1958  2 Sheets-Sheet 2

David A. Hight
John T. Mitchiner
INVENTORS.

BY *Clarence A. O'Brien*
and *Harvey B. Jacobson*
Attorneys

United States Patent Office 2,953,216
Patented Sept. 20, 1960

2,953,216

ENGINE ATTACHMENT

David A. Hight, Box 264, and John T. Mitchiner, Box 107, both of Warrenton, N.C.

Filed Dec. 9, 1958, Ser. No. 779,168

5 Claims. (Cl. 183—14)

This invention relates to engine accessories and attachments and especially to attachments for the internal combustion engines of power lawn mowers.

An object of the invention is to provide an attachment for the induction system of an engine of a lawn mower to eliminate the considerable difficulty encountered in operating such engines caused by carburetion problems.

Another object of the invention is to provide an attachment for a lawn mower or the like engine making the engine considerably easier to start, more economical to operate and more dependable, at the same time providing a conventional power lawn mower with an auxiliary gasoline supply.

A more explicit object of the invention is to provide an engine induction system attachment, especially for an engine lawn mower, wherein there is an auxiliary supply of gasoline for four cycle engines. The auxiliary supply is in an auxiliary tank across the surface of which induction air is drawn to accumulate gaseous vapors which are conducted to the air intake of the engine induction system. There are means for regulating the quantity of air traveling across the auxiliary fuel surface and the quantity of free air which is drawn into the induction system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a conventional lawn mower fitted with an attachment in accordance with the invention;

Figure 5 is an enlarged perspective view of the attachment; and

Figure 6 is an enlarged sectional view taken on the line 6—6 of Figure 1.

In the accompanying drawings there is a part of a conventional internal combustion engine operated power lawn mower 10. The lawn mower has numerous parts which are not shown and not described since they do not enter directly into that structure necessarily described for a clear understanding of the invention. The carburetor of the engine has an air induction pipe 12 to which an air cleaner is ordinarily fastened. The induction pipe constitutes a part of the air induction system for the engine.

Figure 4:
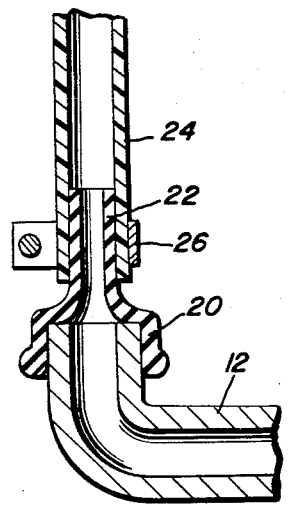
Figure 4 is an enlarged fragmentary sectional view taken on the line 4—4 of Figure 1.
Figure 2:
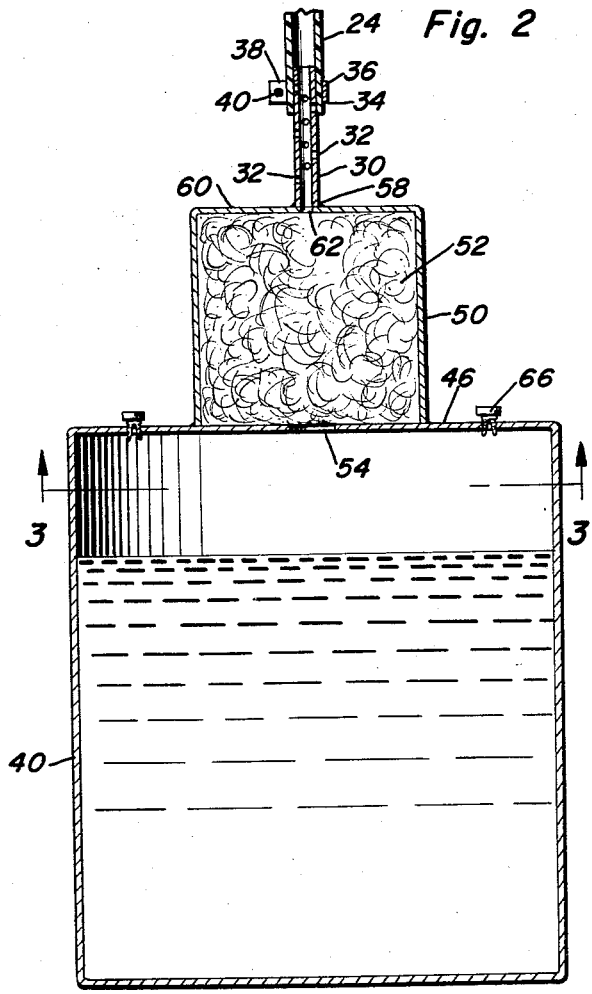
Figure 2 is a sectional view taken on the line 2—2 of Figure 1 and being on enlarged scale.
Figure 3:
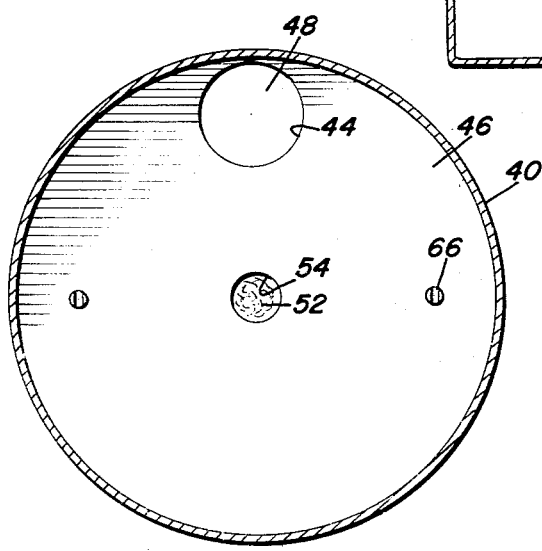
Figure 3 is a transverse sectional view taken on the line 3—3 of Figure 2.

Attachment 14 is used by removing the air cleaner (not shown) and connecting flexible cup 20 to the extremity of induction pipe 12, thereby operatively connecting the cup with the air inlet of the air induction system for the mower engine. Flexible cup 20 has an enlarged end, preferably made of elastomeric plastic or rubber, and a short tube 22 fitted on or in hose 24 and held in place by means of a conventional clamp 26. The tube or hose 24 is connected with a pipe 30, the latter having a plurality of air inlet apertures 32 in its side wall. The connection between tube 24 and pipe 30 is made firm by a clamp 34, the latter consisting of a band 36 having a pair of ears 38 at its extremities, and embracing the side wall of tube 24. A bolt 40 is passed through a pair of openings in ears 38 and may have a wing nut or other type of nut thereon to bring the clamp into firm engagement with the surface of tube 24. Clamp 26 may be constructed identical to this. As seen in Figure 2, the tube 24 may be slid axially on pipe 30 thereby covering or uncovering any number of the group of openings 32 in pipe 30 for the purpose of introducing a smaller or greater amount of air into tube 24 which is conducted through the tube to the engine induction system.

Auxiliary tank 40 is secured to the lawn mower housing in any convenient place and by any suitable means, for instance a mounting bracket on the main housing of the lawn mower. Different manufacturers' makes of lawn mowers will require that the means for mounting the auxiliary tank 40 be varied somewhat and the location of the tank will be varied in accordance with convenience. The tank may be any shape, although a cylindrical auxiliary tank is illustrated. There is an opening 44 in the top wall 46 of the auxiliary tank 40, and a closure cap 48 is attached to a collar around opening 44 so that auxiliary fuel may be placed in the auxiliary fuel tank. A casing 50 is attached to the top wall 46 of the auxiliary tank and is filled with steel wool 52 or some other filter material. The bottom of casing 50 is open and in registry with an opening 54 in the top wall 46 of auxiliary tank 40. The lower extremity of pipe 30 is connected by a weld 58 or is otherwise fastened to the top wall 60 of casing 50 and in registry with an aperture 62 in that top wall.

One or more air inlet openings 64 are in the top wall 46, and there is a valve 66 to control each of the openings 64. A typical valve 66 and opening 64 are shown on enlarged scale in Figure 6. The wall surrounding opening 64 has a screw-thread 70, and valve 66 consists of a screw 72 having a head 74 and provided with a screw-thread 76 in engagement with screw-thread 70. Aperture 78 is in the shank of the screw 72 and is preferably formed with tapered walls so that as the screw is adjusted outwardly of wall 46 the effective size of opening 78 is increased. In this way the quantity of air entering opening 64 (Figure 6) and all other openings similar to it, is adjustable.

In use after installation of the attachment, valves 66 are adjusted to the open position and tube 24 is adjusted to a selected position on pipe 30 depending on the amount of free air which is to be introduced into the system. Instead of drawing pure air from the atmosphere when starting the lawn mower and when running it, air enriched with gaseous vapors is drawn across the surface of the auxiliary fuel by flowing through openings 64 and then openings 54 and 62, respectively, to admix with the atmospheric air that enters apertures 32. The attachment excludes dirt, grass cuttings and the like from the induction system of the engine and provides a considerably richer mixture for engine operation. Further, as the level of auxiliary fuel becomes lower in auxiliary tank 40, less atmospheric air is introduced in the system by adjusting the tube 24 so that it covers more of the apertures 32. The quantity of fuel vapor laden air added to the atmospheric air is adjusted by adjusting the valves 66.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An attachment in combination with the induction system of a lawn mower supported internal combustion engine wherein the induction system includes an air inlet, said attachment comprising an auxiliary fuel tank adapted to contain liquid fuel for the engine, said tank having at least one air inlet opening, a valve connected with said opening, said tank having a second opening through which fuel vapor laden air may be drawn after passing through the valve opening and flowing across the surface of the fuel in said auxiliary fuel tank, means for conducting the vapor laden air from said tank and into said air inlet, the last mentioned means operatively connected for conduction of the vapor laden air from said second aperture of said auxiliary tank and including a casing attached to said tank and having an interior which is in communication with said second aperture, an apertured pipe connected with said casing, a tube on said apertured pipe, means holding said tube in selected positions on said pipe to cover selected apertures of said pipe, and the remaining apertures of said apertured pipe being exposed to the atmosphere to control the richness of the gas laden air in the induction system.

2. An attachment for a lawn mower which has an air induction inlet for an internal combustion engine, said attachment comprising an auxiliary fuel tank, said auxiliary fuel tank having an air inlet opening, said auxiliary fuel tank having a vapor laden air discharge opening spaced from said inlet opening, gas conducting means attached to said induction inlet and connected with said air discharge opening of said auxiliary fuel tank, said gas conducting means including a tube, a pipe nested with said tube and having an air inlet means adapted to register with atmospheric air for introduction of atmospheric air, said tube being movable on said pipe to control the quantity of atmospheric air entering said pipe by covering selected portions of said air inlet means, and means connecting said pipe with said vapor laden air discharge opening of said auxiliary fuel tank, said pipe connecting means including a casing with filter material therein, said casing attached to said auxiliary tank and having said pipe connected therewith.

3. The attachment of claim 2 wherein there is a flexible cup at one end of said tube which is fitted over said induction inlet.

4. The attachment of claim 2 wherein said air inlet in said tank consists of an aperture, and an adjustable slotted screw constituting a valve connected with said aperture to control the quantity of air drawn into said auxiliary fuel tank.

5. The attachment of claim 2 and said hose being flexible, and a clamp on said flexible hose for holding said flexible hose in selected adjusted positions on said pipe.

References Cited in the file of this patent

UNITED STATES PATENTS

| 1,093,718 | Myers | Apr. 21, 1914 |
| 2,797,072 | Lucas | June 25, 1957 |
| 2,844,364 | Eprfanio et al. | July 22, 1958 |